(12) United States Patent
Skroski et al.

(10) Patent No.: US 11,949,121 B2
(45) Date of Patent: Apr. 2, 2024

(54) SYSTEMS AND METHODS FOR A VENTING SEAL FOR BATTERY MODULES IN AN ELECTRIC AIRCRAFT

(71) Applicant: BETA AIR, LLC, South Burlington, VT (US)

(72) Inventors: Tyler John Skroski, Burlington, VT (US); Stuart Denson Schreiber, Essex, VT (US)

(73) Assignee: BETA AIR, LLC, South Burlington, VT (US)

( * ) Notice: Subject to any disclaimer, the term of this patent is extended or adjusted under 35 U.S.C. 154(b) by 0 days.

(21) Appl. No.: 17/564,391

(22) Filed: Dec. 29, 2021

(65) Prior Publication Data
US 2023/0207951 A1 Jun. 29, 2023

(51) Int. Cl.
*H01M 50/325* (2021.01)
*H01M 10/613* (2014.01)
*H01M 10/6553* (2014.01)
*H01M 50/375* (2021.01)
*H01M 50/548* (2021.01)
*H01M 10/625* (2014.01)
*H01M 50/553* (2021.01)

(52) U.S. Cl.
CPC ........ *H01M 50/325* (2021.01); *H01M 10/613* (2015.04); *H01M 10/6553* (2015.04); *H01M 50/375* (2021.01); *H01M 50/548* (2021.01); *H01M 10/625* (2015.04); *H01M 50/553* (2021.01); *H01M 2220/20* (2013.01)

(58) Field of Classification Search
CPC ............ H01M 50/30–375; H01M 50/502–526
See application file for complete search history.

(56) References Cited

U.S. PATENT DOCUMENTS

| 8,277,965 | B2 | 10/2012 | Hermann et al. |
| 10,050,315 | B2 | 8/2018 | Kim et al. |
| 10,995,867 | B2 | 5/2021 | Hall-Snyder et al. |
| 2011/0189511 | A1* | 8/2011 | Yoon .................. H01M 10/625 429/50 |
| 2017/0331323 | A1* | 11/2017 | Ehrmantraut .......... H02S 50/00 |
| 2017/0352897 | A1* | 12/2017 | Adcock ............. H01M 8/04701 |
| 2018/0138478 | A1 | 5/2018 | Chan |
| 2019/0077275 | A1* | 3/2019 | Capati ................... H01M 10/63 |
| 2020/0152941 | A1 | 5/2020 | Wynn et al. |

(Continued)

FOREIGN PATENT DOCUMENTS

WO 2020019570 A1 1/2020

OTHER PUBLICATIONS

Jake Sanders, Protecting Battery Enclosures with Dual-Stage Venting, Dec. 31, 2019.

*Primary Examiner* — Amanda J Barrow
(74) *Attorney, Agent, or Firm* — Hoffman Warnick LLC

(57) ABSTRACT

A system for a venting seal for battery modules in an electric aircraft is presented. The system includes a plurality of battery modules, wherein each battery module comprises a vent conduit, a contactor configured to disengage at least a catalyst battery module as a function of a thermal event, and an electrical bridging device configured to seal off the at least a catalyst battery module as a function of an independent seal, disengage the at least a catalyst battery module from the remaining plurality of battery modules, and transfer electrical energy across the plurality of battery modules.

8 Claims, 7 Drawing Sheets

(56) References Cited

U.S. PATENT DOCUMENTS

| | | | |
|---|---|---|---|
| 2020/0343611 A1* | 10/2020 | Shimizu | F25B 1/00 |
| 2020/0388865 A1* | 12/2020 | Rainville | H01M 8/04992 |
| 2021/0138868 A1* | 5/2021 | Bruneau | H01M 10/6552 |
| 2021/0218079 A1* | 7/2021 | Juzkow | H01M 50/249 |
| 2021/0288379 A1 | 9/2021 | Meredith et al. | |
| 2022/0029431 A1* | 1/2022 | McLean | H02J 7/0047 |
| 2022/0096885 A1* | 3/2022 | Whitman | B60L 58/26 |
| 2023/0327284 A1* | 10/2023 | Godding | H01M 50/593 |
| | | | 429/56 |

\* cited by examiner

SYSTEMS AND METHODS FOR A VENTING SEAL FOR BATTERY MODULES IN AN ELECTRIC AIRCRAFT

FIELD OF THE INVENTION

The present invention generally relates to the field of ventilation. In particular, the present invention is directed to systems and methods for a venting seal for battery modules in an electric aircraft.

BACKGROUND

Batteries used to power an electric vehicle are aligned in deliberate configurations to provide electric power distribution among the multitude of electrical systems in the electric vehicle. Proper battery management in an electric vehicle such as an electric aircraft is crucial as thermal events experienced by the batteries may be catastrophic for an electric aircraft mid-flight. Current technologies incorporate ventilation and cooling techniques to reduce the probability of thermal events or mitigate chemical chain reactions resulting from thermal events. Proper insulation and isolation of individual components of the batteries are crucial in the management of thermal events and batteries of an electric aircraft.

SUMMARY OF THE DISCLOSURE

In an aspect, a system for a venting seal for battery modules in an electric aircraft is present. The system includes a plurality of battery modules, wherein each battery module includes a vent conduit and an independent seal. The independent seal is configured to seal off the battery module from the vent conduit during typical operation and unseal the vent conduit as a function of a thermal event. The system further includes an electrical bridging device configured to disengage at least a catalyst battery module from the remaining plurality of battery modules as a function of a contactor and transfer electrical energy across the remaining plurality of battery modules.

In another aspect a method for a venting seal for battery modules in an electric aircraft is presented. The method includes sealing off, by an independent seal, a battery module of a plurality of battery modules from a vent conduit during typical operation, unsealing, by independent seal, the vent conduit as a function of a thermal event, disengaging, by a contactor of an electrical bridging device, at least a catalyst battery module from the remaining plurality of battery modules, and transferring, by the electrical bridging device, electrical energy across the remaining plurality of battery modules.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
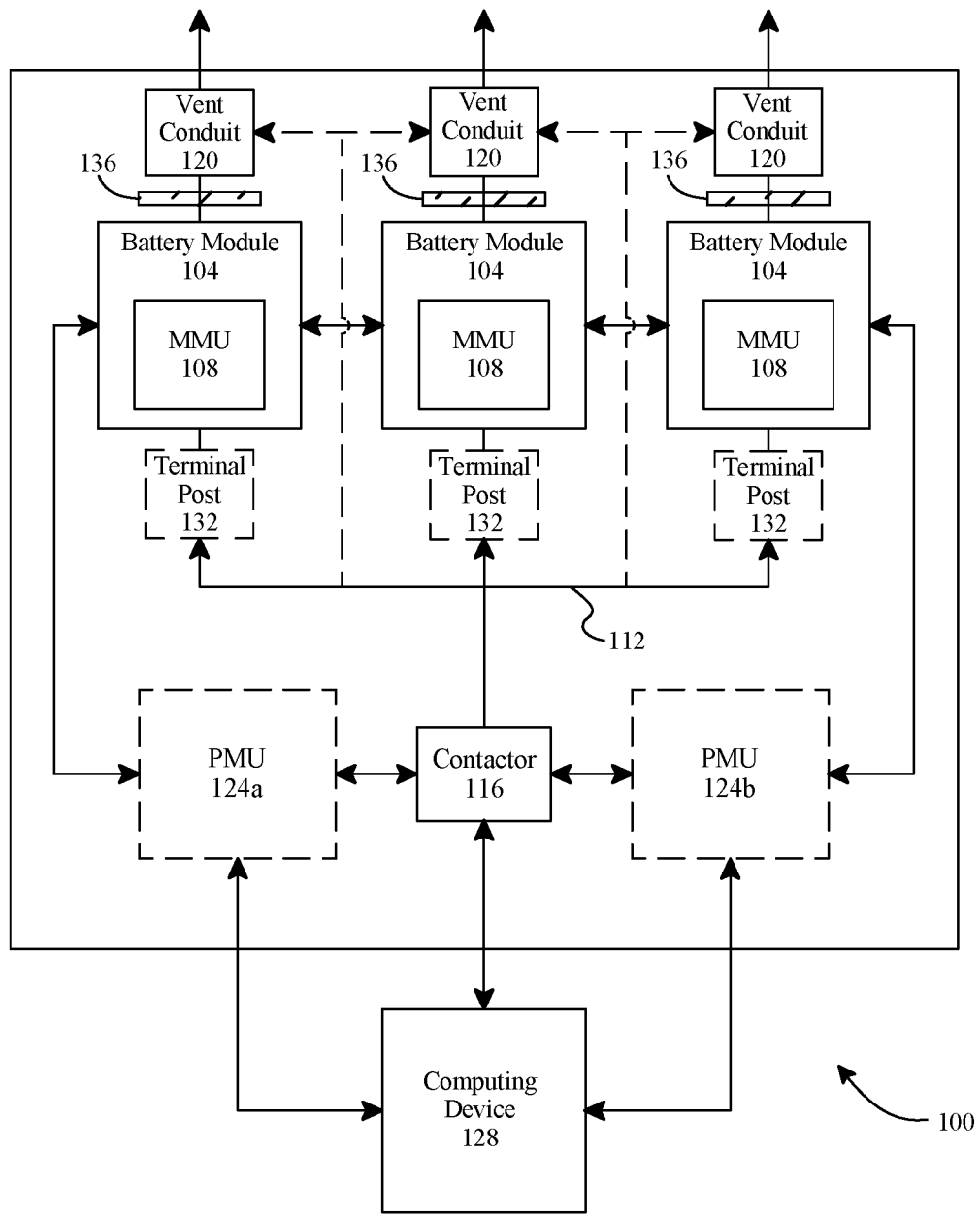
FIG. 1 is a block diagram of an exemplary embodiment of a system for a venting seal for battery modules in an electric aircraft.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for a venting seal for battery modules in an electric aircraft. The electric aircraft may include an electric vertical take-off and landing (eVTOL) aircraft. In an embodiment, an electrical bridging device may include an independent or singular strip/path connecting the battery modules wherein the electrical bridging device may be comprised of mica layers and/or materials. The electrical bridging device may be configured to strip off a portion of the mica layer and form a seal to isolate one or more battery modules experiencing a chemical reaction. The venting seal may be comprised of a plurality of mica layers or any other similar materials with similar thermal, electrical, and mechanical properties. In another embodiment, the venting seal may be comprised of a plurality of mica sheets that provide electrical insulation and thermal conduction. In another embodiment, the mica layers of the venting seal may be flexible in order to at least run across the plurality of battery modules and provide insulation and/or conduction. The flexible properties may also allow for a portion of the venting seal to be stripped off and seal a ventilation channel of a battery module, thereby isolating that battery module in the event that the battery module experiences a thermal runaway to reduce, mitigate, and/or prevent a chemical chain reaction normally pursuant of a thermal event. The mica sheet and/or layer may prevent chemicals and/or gases that may leak from a battery module experiencing a thermal runaway. Aspects of the present disclosure may allow for cooling of individual battery modules. In an embodiment, the contactor may disconnect the battery module experiencing chemical reactions indicating thermal runaway. In an embodiment, a disconnect assembly may be incorporated with the contactor to physically disengage one or more battery modules in the event of a thermal runaway. In some embodiments, the disconnect assembly and/or independent seal may include vent plugs, vent caps, etc., to trap the gases exhuming from those battery modules from the rest of the battery systems. Aspects of the present disclosure may allow for an independent seal to withstand some threshold of thermal runway. The contactor may disconnect a portion of the electrical bridging device containing a strip of mica layer and seal off a battery module conducive to a thermal runaway by wrapping a vent or channel connecting that battery module to the electrical bridging device. The seal may have flexible and resistive materials to withstand any exhuming chemicals, heat, gas, and the like thereof, exhuming from the battery module to a certain extent to isolate the battery module conducive to thermal runaway for some extended period of time until the battery module is properly attended to or replaced.

Aspects of the present disclosure can be used to cool one or more battery modules in the event one or more battery modules indicate thermal runaway. In an embodiment, when the battery modules are sealed off and isolated from the remaining functioning battery modules, a vent conduit may be formed wherein the gas, heat, and/or chemicals may be driven out of the battery modules and out of the body of the electric aircraft. The vent conduit may be connected to a vent outlet configured to expel such substances. In another embodiment, the vent conduit may be integrated with cooling fins to allow for cooling of the battery modules and redirecting the hot air, gas, chemicals, etc., out of the vent conduit and out of the electric aircraft as a function of the vent outlet.

Aspects of the present disclosure allow for detecting and measuring thermal parameters by sensors integrated within the battery modules or a battery pack housing the battery modules. Each battery module may include two distinct sensors such as two module monitor units. The two distinct sensors may be configured to, at least in part, to detect any discrepancies of thermal parameters produced by a battery module. In an embodiment, a discrepancy may indicate an unusual high rate of temperature increase which may be conducive of a thermal runaway. Aspects of the present disclosure may include a computing device configured to receive data from the plurality of module monitor units to determine a thermal runaway is present and disconnect the battery modules associated with the thermal event as a function of the contactor on the electrical bridging device. The contactor may seal off those battery modules. In another embodiment, the computing device may be configured to determine whether to seal off a battery module based on a threshold that discerns whether or not the thermal parameters produced by a battery module warrants it being removed from the rest of the battery modules in a battery pack.

Aspects of the present disclosure can be used to disengage electrical communication from and/or within a battery pack as a function of battery condition. Aspects of the present disclosure can also be used to predict and prevent thermal runaway of at least a battery module. In an embodiment, thermal runaway may be prevented by disengaging electrical communication from and/or within a battery pack can prevent continued temperature rise characteristic of thermal runaway. Aspects of the present disclosure can also allow for safer air travel with electric aircraft. Exemplary embodiments illustrating aspects of the present disclosure are described below in the context of several specific examples.

Referring now to FIG. 1, an exemplary embodiment of a system 100 for a venting seal for battery modules in an electric is illustrated. System 100 includes a plurality of battery modules 104. A "battery module," as used in this disclosure, is a battery unit that contains a plurality of battery cells that have been wired together in series, parallel, or a combination of series and parallel, wherein the "battery module" holds the battery cells in a fixed position. For instance and without limitation, battery module 104 may be consistent with any battery module disclosed in U.S. application Ser. No. 17/404,500 and entitled, "STACK BATTERY PACK FOR ELECTRIC VERTICAL TAKE-OFF AND LANDING AIRCRAFT," which is incorporated by reference herein in its entirety. Alternatively or additionally, battery module 104 may be consistent with the battery module in U.S. application Ser. No. 17/475,743, and entitled "BATTERY SYSTEM AND METHOD OF AN ELECTRIC AIRCRAFT WITH SPRING CONDUCTORS," which is incorporated by reference herein in its entirety. The plurality of battery modules may be housed within a battery pack. A "battery pack," as used in this is an energy storage devices that includes a plurality of battery modules. Persons skilled in the art, upon reviewing the entirety of this disclosure, will be aware of the various embodiments of an energy storage device in the context of housing a plurality of individual battery modules.

With continued reference to FIG. 1, battery module 104 may include at least an electrochemical cell. For the purposes of this disclosure, an "electrochemical cell" is a device capable of generating electrical energy from chemical reactions or using electrical energy to cause chemical reactions. Further, voltaic or galvanic cells are electrochemical cells that generate electric current from chemical reactions, while electrolytic cells generate chemical reactions via electrolysis. In some embodiments, battery module 104 may include cylindrical battery cells. For the purposes of this disclosure, cylindrical battery cells are round battery cells that have a larger height than diameter. In some embodiments, battery module 104 may include a pouch cell. As used in this disclosure, "pouch cell" is any battery cell or module that includes a pocket. In some cases, a pouch cell may include or be referred to as a prismatic pouch cell, for example when an overall shape of pouch is prismatic. In some cases, a pouch cell may include a pouch which is substantially flexible. Alternatively or additionally, in some cases, a pouch may be substantially rigid. In some cases, a pouch may include a polymer, such as without limitation polyethylene, acrylic, polyester, and the like. In some embodiments, a pouch may be coated with one or more coatings. For example, in some cases, a pouch may have an outer surface. In some embodiments, an outer surface may be coated with a metalizing coating, such as an aluminum or nickel containing coating. In some embodiments, a pouch coating may be configured to electrically ground and/or isolate pouch, increase pouch impermeability, increase pouches resistance to high temperatures, increases pouches thermal resistance (insulation), and the like. An electrolyte may be located in a pouch. In some embodiments, an electrolyte may include a liquid, a solid, a gel, a paste, and/or a polymer. In some embodiments, an electrolyte may include a lithium salt such as $LiPF_6$. In some embodiments, a lithium salt may include lithium hexafluorophosphate, lithium tetrafluoroborate, lithium perchlorate, or other lithium salts. In some embodiments, a lithium salt may include an organic solvent. In some embodiments, an organic solvent may include ethylene carbonate, dimethyl carbonate, diethyl carbonate or other organic solvents. In some embodiments, an electrolyte may wet or contact one or both of a pair of conductive tabs of a battery cell. A "conductive tab" as used in this disclosure is any protruding component capable of carrying a current.

With continued reference to FIG. 1, battery cells of the plurality of battery modules 104 may include, without limitation, a battery cell using nickel-based chemistries such as nickel cadmium or nickel metal hydride, a battery cell using lithium-ion battery chemistries such as a nickel cobalt aluminum (NCA), nickel manganese cobalt (NMC), lithium iron phosphate (LiFePO$_4$), lithium cobalt oxide (LCO), lithium manganese oxide (LMO), a battery cell using lithium polymer technology, and/or metal-air batteries. The battery cells may include lead-based batteries such as without limitation lead acid batteries and lead carbon batteries. In a non-limiting embodiment, the battery cells may include lithium sulfur batteries, magnesium ion batteries, and/or sodium ion batteries. In another non-limiting embodiment, the battery cells may include solid state batteries or supercapacitors or another suitable energy source. Persons skilled in the art, upon reviewing the entirety of this disclosure, will be aware of various devices of components that may be used as a battery cell.

With continued reference to FIG. 1, battery module 104 may include a sensor. A "sensor", for the purpose of this disclosure, is a device that is configured to detect an input and/or a phenomenon and transmit information related to the detection. In one or more embodiments, and without limitation, the sensor may include a plurality of sensors. In one or more embodiments, and without limitation, the sensor may include one or more temperature sensors, voltmeters, current sensors, hydrometers, infrared sensors, photoelectric sensors, ionization smoke sensors, motion sensors, pressure sensors, radiation sensors, level sensors, imaging devices, moisture sensors, gas and chemical sensors, flame sensors, electrical sensors, imaging sensors, force sensors, Hall sensors, and the like. The sensor may include any computing device as described in the entirety of this disclosure and configured to convert and/or translate a plurality of signals detected into electrical signals for further analysis and/or manipulation. Electrical signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal. In a non-limiting embodiment, the sensor may include a plurality of sensors comprised in a sensor suite. For example and without limitation, the sensor may include flow sensors, temperature sensors, altimeters, pressure sensors, proximity sensors, airspeed indicators, position sensors, global positioning system (GPS), humidity sensors, level sensors, gas sensors, wireless sensor networks (WSN), compasses, magnetometers, altitude heading and reference systems (AHRSes), tachometers, etc. In a non-limiting embodiment, the sensor may be communicatively connected to battery module 104. As used in this disclosure, "communicatively connected" is defined as a process whereby one device, component, or circuit is able to receive data from and/or transmit data to another device, component, or circuit; communicative connecting may be performed by wired or wireless electronic communication, either directly or by way of one or more intervening devices or components. In an embodiment, communicative connecting includes electrically coupling an output of one device, component, or circuit to an input of another device, component, or circuit. Communicative connecting may include indirect connections via "wireless" connection, low power wide area network, radio communication, optical communication, magnetic, capacitive, or optical coupling, or the like. At least pilot control may include buttons, switches, or other binary inputs in addition to, or alternatively than digital controls about which a plurality of inputs may be received. Persons skilled in the art, upon reviewing the entirety of this disclosure, will be aware of the various embodiments of controlling a cursor for visual data manipulation for purposes as described herein. Persons skilled in the art, upon reviewing the entirety of this disclosure, will also be aware of the various warning symbols that may be employed to grab the attention of a pilot in the context of simulation consistently described in the entirety of this disclosure.

Still referring to FIG. 1, in a non-limiting embodiment, the sensor may include a moisture sensor. "Moisture", as used in this disclosure, is the presence of water, which may include vaporized water in air, condensation on the surfaces of objects, or concentrations of liquid water. Moisture may include humidity. "Humidity", as used in this disclosure, is the property of a gaseous medium (almost always air) to hold water in the form of vapor. In one or more embodiments, the sensor may include electrical sensors. Electrical sensors may be configured to measure voltage across a component, electrical current through a component, and resistance of a component. In one or more embodiments, the sensor may include thermocouples, thermistors, thermometers, infrared sensors, resistance temperature sensors (RTDs), semiconductor based integrated circuits (ICs), a combination thereof, or another undisclosed sensor type, alone or in combination. Temperature, for the purposes of this disclosure, and as would be appreciated by someone of ordinary skill in the art, is a measure of the heat energy of a system. Temperature, as measured by any number or combinations of sensors present within the sensor, may be measured in Fahrenheit (° F.), Celsius (° C.), Kelvin (° K), or another scale alone or in combination. The temperature measured by sensors may comprise electrical signals which are transmitted to their appropriate destination wireless or through a wired connection. Persons skilled in the art, upon reviewing the entirety of this disclosure, will be aware of the various embodiments of a sensor in the context of measuring battery data.

With continued reference to FIG. 1, the sensor may transduce a detected phenomenon, such as without limitation, temperature, voltage, current, pressure, and the like, into a sensed signal. The sensor may include a module monitor unit (MMU) 200 as pictured in FIG. 2. A "module monitor unit," as used in this disclosure, is a sensing device configured to detect a plurality of inputs and/or phenomenon of the MMU. For instance and without limitation, MMU 108 may be consistent with the MMU in U.S. patent application Ser. No. 17/529,447 and entitled, "MODULE MONITOR UNIT FOR AN ELECTRIC AIRCRAFT BATTERY PACK AND METHODS OF USE," which is incorporated by reference herein in its entirety. Each battery module 104 of the plurality of battery modules may include MMU 108. In a non-limiting embodiment, MMU 108 may be configured to detect a measured battery data and generate a thermal datum as a function of the measured battery data. A "measured battery data," as used in this disclosure, is any thermal parameter and/or battery parameter related to battery module 104. For example and without limitation, the measured battery data may include voltage ratings, capacity ratings, state of charge (SoC) and/or battery state of charge (BSoC), depth of discharge (DoD), charging and discharging rates, charging and discharging regimes, and the like thereof. A "thermal datum," as used in this disclosure, is a collection of data that translates the measured battery data into electrical signals comprising of information describing a battery module in at least a readable form. Alternatively or additionally, any datum captured by any sensor may include circuitry, computing devices, electronic components or a combination thereof that translates into at least an electronic signal configured to be transmitted to another electronic component.

Alternatively or additionally, the sensor may include one or more pack monitor units (PMU) 124a-b. A "pack monitor unit," as used in this disclosure, is a device used to measure the parameters of the plurality of battery modules in a battery pack. For instance and without limitation, the PMU may be consistent with the PMU in U.S. patent application Ser. No. 17/529,583 and entitled, "PACK MONITORING UNIT FOR AN ELECTRIC AIRCRAFT BATTERY PACK AND METHODS OF USE FOR BATTERY MANAGEMENT," or U.S. patent application Ser. No. 17/529,447, and titled "A MODULE MONITOR UNIT FOR AN ELECTRIC AIRCRAFT BATTERY PACK AND METHODS OF USE", the entirety of both applications is hereby incorporated by reference. In a non-limiting embodiment, the battery pack may include two PMUs such as PMU 124a and PMU 124b. Each PMU may be configured to measure a battery pack datum. A "battery pack datum," for the purpose of this disclosure, is a collection of information describing one or more characteristics corresponding to at least a portion of a battery pack of an electric aircraft. For instance and without limitation, the battery pack datum may be consistent with the battery pack datum in U.S. patent application Ser. No. 17/515,458 and entitled, "SYSTEM AND METHOD FOR MANAGING RESIDUAL ENERGY FOR AN ELECTRIC AIRCRAFT," which is incorporated by reference herein in its entirety. In a non-limiting embodiment, PMU 124a and/or PMU 124b may be configured to measure the battery pack and/or the plurality of battery modules, wherein each PMU generates its own battery pack datum. For instance, PMU 124a may be triggered to measure the battery pack and generate a battery pack datum. PMU 124b may be triggered to measure the battery pack and generate a battery pack datum after some time interval such as 5 milliseconds to allow computing device 128 to detect any discrepancies between the battery pack datums of PMU 124a and PMU 124b. In some embodiments, a discrepancy may indicate some thermal event. Persons skilled in the art, upon reviewing the entirety of this disclosure, will be aware of measuring the data of the same battery multiple times in the context of detecting discrepancies and thermal events.

Still referring to FIG. 1, battery module 104 may include two MMUs 108, wherein each MMU is configured to detect and/or measure the same data and/or parameters of battery module 104, but in different instances. For example and without limitation, one MMU may be triggered to measure data of battery module 104 and the other MMU may be triggered to measure data of the same battery module after some time interval, wherein the time interval may include short bursts of time such as 5 milliseconds. The time interval may allow a computing device to compare the data measured by the two MMUs. For instance, ideally, the data measured by the two MMUs may be identical or expectedly similar. Any significant change in data may indicate a thermal event. A "thermal event," as used in this disclosure, is a chemical reaction indicating a substantial rise or acceleration in the increase of temperature of a battery module. In a non-limiting embodiment, the thermal event may include, but not limited to, a thermal runaway, a short circuit, leakage of gas and/or chemicals, and the like thereof. Alternatively or additionally, the thermal event may include an indication of a thermal event. A "thermal runaway," as used in this disclosure is the event in which heat generated within a battery module exceeds the amount of heat that is dissipated to its surroundings. In a non-limiting embodiment, the thermal runaway may include a chain reaction within battery module 104.

With continued reference to FIG. 1, system 100 may include an electrical bridging device 112. An "electrical bridging device," as used in this disclosure, is a component including a metallic strip or bar configured for local high current/voltage power distribution. For instance and without limitation, electrical bridging device 112 may be consistent with the electrical bridging device in U.S. patent application Ser. No. 17/405,365, and entitled, "BATTERY ASSEMBLY FOR AN AIRCRAFT," or U.S. patent application Ser. No. 17/564,361 and entitled, "SYSTEMS AND METHODS FOR LAMINATED BUSWORK WITH FLEXIBLE CONDUCTORS FOR AN ELECTRIC AIRCRAFT," both of which are incorporated by reference herein in their entirety. Electrical bridging device 112 may be configured to connect the plurality of battery modules to each other. In a non-limiting embodiment, electrical bridging device 112 may be connected to both positive and negative terminals of each battery module 104. In another non-limiting embodiment, electrical bridging device 112 may be configured to connect a plurality of battery packs together. Electrical bridging device 112 may include a singular strip and/or path connecting the plurality of battery modules. The singular strip may cover each terminal post 132 of each battery module 104. In a non-limiting embodiment, battery module 104 may include a positive terminal post and a negative terminal post. Electrical bridging device 112 may be configured to form a ring with a singular strip of mica layers and/or sheets. Electrical bridging device 112 may be comprised of mica materials. A "mica material," as used in this disclosure, is a group of minerals whose outstanding physical characteristic is that individual mica crystals can easily be split into extremely thin elastic plates. The mica materials may provide insulation for each battery module 104. In a non-limiting embodiment, electrical bridging device 112 may be configured to transfer electrical energy across the plurality of battery modules. Electrical bridging device 112 may be made up of a plurality of mica layers and/or sheets. Persons skilled in the art, upon reviewing the entirety of this disclosure, will be aware of the various embodiments of mica materials in the context of thermal insulation and conduction.

Still referring to FIG. 1, electrical bridging device 112 may be in contact with a contactor 116. A "contactor," as used in this disclosure, is an electrical component configured to selectably disengage electrical communication. For instance and without limitation, contactor 116 may be consistent with the contactor in U.S. patent application Ser. No. 17/529,583 and entitled, ""PACK MONITORING UNIT FOR AN ELECTRIC AIRCRAFT BATTERY PACK AND METHODS OF USE FOR BATTERY MANAGEMENT." In some cases, a contactor may include a switch, a relay, a solenoid, a motor, or the like. At least a contactor may selectably disengage electrical communication within at least a conductor. A "conductor," as used in this disclosure, is any device that conducts thermal or electrical energy, such as a portion of electrical bridging device 112. In some cases, a contactor may physically break a connection within a conductor to disengage electrical communication. In some embodiments, a contactor may include an electrically-controlled switch used for switching an electrical power circuit. In some cases, a contactor may be controlled by a circuit having a much lower power level than a switched circuit which the contactor selectably disengages. For instance, a contactor 116 comprising 24-volt coil electromagnet solenoid may switch a 230-volt motor circuit. Alternatively or additionally, in some cases, contactor 116 may be controlled in a non-electrical manner, such as without limitation pneumatically, hydraulically, mechanically, and the like. For example, without limitation in some cases, contactor 116 may be driven by compressed air. In some cases, a contactor 116 may be directly connected to high-current devices. For example, in some cases, a contactor 116 may switch more than 5 amperes or be used in electrical circuits having an electrical load greater than a kilowatt. In some cases, contactor 116 may be normally open. As used in this disclosure, "normally open" refers to a default or uncontrolled state being open, unconnected, or disengaged. In some cases, contactor 116 may be normally closed. As used in this disclosure, "normally closed" refers to a default or uncontrolled state being closed, connected, or engaged. In some embodiments, contactor 116 may be configured to control and/or suppress an arc produced when engaging, disengaging, or interrupting heavy motor currents.

With continued reference to FIG. 1, contactor 116 may be configured to disengage at least a catalyst battery module as a function of a thermal event. A "catalyst battery module," as used in this disclosure is a battery module experiencing and/or indicative of a thermal event. In a non-limiting embodiment, one or more battery modules may be a catalyst battery module. In the event a thermal event is detected and/or one or more catalyst battery module is identified, electrical bridging device 112 may be configured to seal off the one or more catalyst battery modules. In a non-limiting embodiment, electrical bridging device 112 may seal off some port from battery module 104 connecting to electrical bridging device 112 using mica materials. Battery module 104 may include a terminal post 132. A "terminal post," as used in this disclosure, is a port that attaches a battery module to an electrical bridging device. Terminal post 132 may be comprised of conductive materials to transfer electrical energy from battery module 104 and distributed to a plurality of flight components as a function of electrical bridging device 112, wherein electrical bridging device 112 allows for distributed electrical energy. A "flight component," as used in this disclosure, is any component related to, and mechanically connected to an aircraft that manipulates a fluid medium in order to propel and maneuver the aircraft through the fluid medium. For example and without limitation, a flight component may include, propellers, vertical propulsors, forward pushers, landing gears, rudders, motors, rotors, and the like thereof. Terminal post 132 may include a positive terminal post and a negative terminal post. Terminal post 132 may include an intake tube which is exposed to electrical bridging device 112, while vent conduit 120 is an exhaust tube. In a non-limiting embodiment, battery module 104 may include a vent conduit 120. A "vent conduit," as used in this disclosure, is a passage allowing ejecta and other material to exit from a device. For the purposes of this disclosure "fluidly connected" means that fluid is able to flow from one of the fluidly connected elements to the other, notwithstanding any elements that temporarily or optionally restrict fluid flow, such as, as non-limiting examples, a check valve or a pressure disk.

With continued reference to FIG. 1, vent conduit 120 may be made of a material capable of withstanding the temperatures of the aircraft and/or battery module 104. As a non-limiting example, the vent conduit 120 may be made of a material that is capable of withstanding battery ejecta that may be produced by battery module 104. In some embodiments, vent conduit 120 may be made of a polymer. As a non-limiting example, vent conduit 120 may be made of carbon fiber. As another non-limiting example, vent conduit 120 may be made of a carbon fiber composite.

With continued reference to FIG. 1, vent conduit 120 may have a flow path. The flow path represents a hypothetical path that a battery ejecta and other fluid may take when it transits vent conduit 120. A "battery ejecta," as used in this disclosure, is any material that is forced or thrown out of a battery module as a result of a thermal event. The flow path may have a variety of profiles. In some embodiments, the flow path may be designed such that the battery ejecta and other fluid transits vent conduit 120 using the force of gravity. In some embodiments, the flow path may be linear and decreasing. In some embodiments, the flow path may have multiple different slopes. As a non-limiting example, the flow path may have a first section with a greater negative slope and a second section with a smaller negative slope. In some embodiments, the flow path may be concave. In some embodiments, the flow path may be convex. In some embodiments, the flow path may be vertical. Alternatively or additionally, vent conduit 120 may include a container configured to house battery module 104. The container may be comprised of glass with concentrated solution of sodium bicarbonate applied to moistened pads attached to the walls of the container. One of ordinary skill in the art, having reviewed the entirety of this disclosure, would appreciate that a variety of the flow path are possible.

Still referring to FIG. 1, terminal post 132 of each battery module 104 may be communicatively connected to contactor 116 as a function of electrical bridging device 112. In a non-limiting embodiment, contactor 116 and/or electrical bridging device 112 may seal off terminal post 132 of at least a catalyst battery module. For example and without limitation, contactor 116 may incorporate any switch, load, relay, disconnecting mechanism, and the like thereof, to detach any battery module such as the at least a catalyst battery module from the system. The remaining plurality of battery modules are thus unaffected by the at least a catalyst battery module and its thermal event. In a non-limiting embodiment, electrical bridging device 112 and/or contactor 116 may reestablish electrical connection with the remaining plurality of battery modules. An "electrical connection," as used in this disclosure, is a medium in which electrical energy may flow through. In a non-limiting embodiment, electrical bridging device 112 may temporarily halt electrical connection using contactor 116 in order to isolate and/or disengage the at least a catalyst battery module and reestablish electrical connection among the plurality of remaining battery modules. In another non-limiting embodiment, electrical bridging device 112 may isolate and/or disengage the at least a catalyst battery module from the remaining plurality of battery modules without interrupting the transfer of electrical energy from the remaining plurality of battery modules. Persons skilled in the art, upon reviewing the entirety of this disclosure, will be aware of the various embodiments of electrical bridging devices for maintaining consistent transfer of electrical energy in the context of the isolation of a disruptive element.

With continued reference to FIG. 1, an independent seal 136 may seal off the at least a Catalyst battery module. An "independent seal," as used in disclosure, is a fastening and/or closing device used to contain any substance exhuming from battery module 104. In a nonlimiting embodiment, independent seal 136 may also isolate at least a catalyst battery module in the event of a thermal event. Independent seal may be comprised of insulation materials and/or a plurality of layers of insulation materials. Independent seal 136 may be comprised of mica materials and/or layers of mica materials. In a non-limiting embodiment, the material makeup of independent seal 136 may be highly heat resistant. For example and without limitation, independent seal 136 may include a thin layer and/or plurality of thin layers of mica materials that may contain at least a portion of the heat of battery module 104 during typical operation by sealing off battery module 104 from the remaining plurality of battery modules. This allows each battery module to have some independence from each other but also prevent unnecessary influence on each other. The electrical connection may be reestablished as a function of any mechanism, switch, load, or combination thereof. As used in this disclosure, a "typical operation," is any operation by an electric aircraft in which no thermal event has occurred. In a non-limiting embodiment, independent seal 136 may be configured to seal battery module 104 from vent conduit 120 in order to isolate each battery module and circulate heat within each battery module's compartment.

Still referring to FIG. 1, independent layer 136 may include a singular strip and/or path configured to seal an opening for ventilation such as vent conduit 120 for each battery module 104. In a non-limiting embodiment, independent seal 136 may include a portion of mica layers used to form independent seal 136 over an opening to vent conduit 120. For example and without limitation, each vent conduit 120 may be sealed by independent seal 136 initially. This is to, at least in part, isolate each battery module with its own battery ejecta heat, chemicals, gases, or combination thereof, and avoid leaking any excess material or heat to affect the remaining plurality of battery modules and system 100 as a whole. In a non-limiting embodiment, independent seal 136 may include highly heat resistant, durable, and flexible properties in order to withstand, to a certain degree, the excess battery ejecta, high temperature, chemicals, gases, etc., of battery module 104. The thermal event of the at least a catalyst battery may then be exposed to vent conduit 120 as a result of independent seal 136 being unsealed. Vent conduit 120 may allow the battery ejecta to be removed and provide ventilation of the at least a catalyst module while also preventing any contamination of the remaining plurality of battery modules. In other words, independent seal 136 may be configured to allow the cooling and ventilation of the at least a catalyst battery module causing the thermal event and preventing it from heating up while unaffecting the remaining plurality of battery modules. Persons skilled in the art, upon reviewing the entirety of this disclosure, will be aware of the various embodiments of using a seal to ventilate a battery module in the event of a thermal event for purposes as described herein.

With continued reference to FIG. 1, independent seal 136 may be unsealed as a function of a thermal event. In a non-limiting embodiment, independent seal 135 may melt, deteriorate, weaken, or the like, or the like, allowing for the cooling and ventilation of the at least a catalyst battery module. In another non-limiting embodiment, independent seal 136 may include a plurality of thin mica layers that may be configured to break apart and/or fracture as a function of the pressure and are impact of battery ejecta from the at least a catalyst batter module. For example and without limitation, independent seal 136 may be highly resistive but thin enough for it to fracture and/or break apart and allow for the cooling and ventilation of the at least a catalyst battery module. The existence of the battery ejecta causing high pressure and/or impact to break apart and/or fracture independent seal 136 may result from a thermal event. In another non-limiting embodiment, independent seal 136 may be unsealed as a function of a disconnect assembly upon exposure to high heat and/or pressure exceeding some thermal threshold. The disconnect assembly may include, but not limited to, a check valve and/or bilayer piece of material. For example and without limitation, the disconnect assembly may include an inner layer that facies towards the battery module may have a higher coefficient of thermal expansion than an outer layer so that the inner layer may peal, melt, and/or pop out in the event of a thermal event. Persons skilled in the art, upon reviewing the entirety of this disclosure, will be aware of the various embodiments of a seal in the context of ventilation.

Still referring to FIG. 1, vent conduit 120 is also fluidly connected to a vent outlet. For the purposes of this disclosure, a "vent outlet" is an opening through which material carried by a vent conduit can exit a device. Vent conduit 120 may have any cross-sectional shape configured to allow battery ejecta and other fluids to move to the vent outlet and out of the body of the electric aircraft. The cross section of vent conduit 120 may be circular, rectangular, trapezoidal, elliptical, triangular, irregular, square, and the like. A person of ordinary skill in the art would, after reviewing the entirety of this disclosure, appreciate that a wide variety of cross-section shapes are possible.

With continued reference to FIG. 1, vent conduit 120 may include a cooling device configured to allow cooling of the at least a catalyst battery module. A "cooling device," as used in this disclosure, is a device used to provide cooling to high temperature devices. The cooling device may include cooling fins. As used this disclosure, "cooling fins" are devices used to drive cool air into a contained space and expel hot air out of a vent conduit. For instance and without limitation, the cooling fins may be consistent with the cooling fins in U.S. patent application Ser. No. 17/563,331. The cooling device may work in tandem with the vent plug to manage the at least a catalyst battery module. Persons skilled in the art, upon reviewing the entirety of this disclosure, will be aware of the various embodiments of cooling devices in the context of providing ventilation and management of batteries.

With continued reference to FIG. 1, contactor 116 may be configured to disengage the at least a catalyst battery module as a function of a thermal threshold. A "thermal threshold," as used in this disclosure, is a concentration of thermal and/or battery parameters to which some response is warranted. For example and without limitation, the thermal threshold may include an upper value limit of some thermal and/or battery temperatures in which MMU 108 and/or PMU 124a-b may detect some degree of discrepancy that denotes the thermal event. In another example, the battery pack datum and/or thermal datum may be analyzed by computing device 128 and determine a thermal event has occurred based on the thermal threshold and disengage the at least a catalyst battery module responsible for the thermal event using contactor 116 and/or independent seal 136. In a non-limiting embodiment, the properties of independent seal 136 may be consistent with the thermal threshold and be configured to melt, deteriorate, and/or burst in the event the thermal threshold has been exceeded.

Alternatively or additionally, system 100 may include a disconnect assembly. A "disconnect assembly," as used in this disclosure, is a device used to disengage a battery module from the electrical bridging device. In a non-limiting embodiment, each battery module 104 may be connected to a disconnect assembly of a plurality of disconnect assemblies. In another non-limiting embodiment, the disconnect assembly may be communicatively connected to terminal post 132 and/or vent conduit 120 of battery module 104. In another non-limiting embodiment, the disconnect assembly may include receptacles configured to cover the terminal post 132 of battery module 104. The disconnect assembly may be configured to prevent accidental shorting during the installation and removal of battery module 104. In a non-limiting embodiment, the disconnect assembly may include a vent plug configured to regulate the exhaust of the battery ejecta of the at least a catalyst battery module. A "vent plug," as used in this disclosure, is a device used to screw into some port such as a portion of a vent conduit of a battery module. In a non-limiting embodiment, the vent plug may initially be screwed tightly in some housing to prevent excess heat, gas, chemicals, and the like thereof, from escaping battery module 104 or escaping from a separate container housing individual battery modules. The disconnect assembly may be configured to tightly screw and/or loosen the screw of the vent plug based on some thermal event. For example and without limitation, in the event of a thermal event and/or in the event of a thermal event is imminent, the disconnect assembly may loosen the vent plug, thereby opening some vent and/or path to vent conduit 120 so that the battery ejecta of the at least a catalyst battery module may escape. The disconnect assembly may control the vent plug to manage the release of battery ejecta and/or manage the cooling of battery module 104. Persons skilled in the art, upon reviewing the entirety of this disclosure, will be aware of the various embodiments of some disconnect assembly managing the exhaust of materials from a vent in the context of ventilation.

With continued reference to FIG. 1, contactor 116 may be configured to reestablish an electrical connection as a function of breaking off the at least a catalyst battery module. For example and without limitation, contactor 116 may reestablish electrical connections with only the remaining plurality of battery modules and excluding any catalyst battery module of the system. The electrical connection may be temporarily disconnected during a detected thermal event and/or determination of at least a catalyst battery module. In another non-limiting embodiment, contactor 116 may be configured to communicate with MMU 108 and/or any thermal sensor to detect when the temperature of a battery module 104 has dropped below some lower value of the thermal threshold prior to reconnection. Persons skilled in the art, upon reviewing the entirety of this disclosure, will be aware of the various embodiments of isolating and maintaining connection in the context of thermal runaway events.

In a non-limiting embodiment, the disconnect assembly may include some device and/or mechanism to reconnect electrical bridging device 112 as a function of a portion of it being used to form independent seal 136 to isolate the at least a catalyst battery module. In a non-limiting embodiment, electrical bridging device 112 may include a singular strip of mica materials, layers, sheets, or combination thereof, wherein the singular strip is wide enough wherein a portion of it that is used to isolate the at least a catalyst battery module, by covering terminal post 132 with a stripped off portion of mica of electrical bridging device 112, may not cut electrical bridging device 112 into more than one singular strip and/or piece. For example and without limitation, terminal post 132 may include an intake tube with a circular opening, wherein a circular portion of mica material of electrical bridging device 112 may be removed to seal off the at least a catalyst battery module and from independent seal 136. The circular portion removed from the mica material of electrical bridging device 112 may not be large enough to separate electrical bridging device 112 into two or more separate strips. Persons skilled in the art, upon reviewing the entirety of this disclosure, will be aware of the various shapes and embodiments of electrical bridging device 112 in the context of maintaining structure.

With continued reference to FIG. 1, a computing device 128 may be communicatively connected to MMU 108 and/or a plurality of MMUs of the plurality of battery modules. Alternatively or additionally, computing device 128 may be communicatively connected to PMU 124a and PMU 124b, wherein each PMU is connected to the plurality of battery modules and/or MMUs. In a non-limiting embodiment, computing device 128 may include any computing device as described in this disclosure, including without limitation a microcontroller, microprocessor, digital signal processor (DSP) and/or system on a chip (SOC) as described in this disclosure. In a non-limiting embodiment, computing device 128 may include a flight controller. Computing device 128 may include, be included in, and/or communicate with a mobile device such as a mobile telephone or smartphone. Computing device 128 may include a single computing device operating independently, or may include two or more computing device operating in concert, in parallel, sequentially or the like; two or more computing devices may be included together in a single computing device or in two or more computing devices. Computing device 128 may interface or communicate with one or more additional devices as described below in further detail via a network interface device. Network interface device may be utilized for connecting computing device 128 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 128 may include but is not limited to, for example, a computing device or cluster of computing devices in a first location and a second computing device or cluster of computing devices in a second location. Computing device 128 may include one or more computing devices dedicated to data storage, security, distribution of traffic for load balancing, and the like. Computing device 128 may distribute one or more computing tasks as described below across a plurality of computing devices of computing device, which may operate in parallel, in series, redundantly, or in any other manner used for distribution of tasks or memory between computing devices. In an embodiment, in order to enable scalability of system 100 and/or computing device, computing device 128 may be implemented using a "shared nothing" architecture in which data is cached at the worker.

With continued reference to FIG. 1, computing device 128 may be designed and/or configured to perform any method, method step, or sequence of method steps in any embodiment described in this disclosure, in any order and with any degree of repetition. For instance, computing device 128 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 128 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, computing device 128 may be configured to determine a thermal event. The thermal event may be determined as a function of the thermal datum from the plurality of MMUs. In a non-limiting embodiment, computing device 128 may determine the thermal event as a function of the thermal threshold. Computing device 128 may compare the thermal datum and determine whether or not the battery and/or thermal parameters indicate a discrepancy indicating a thermal event, in which the computing device 128 may instruct contactor 116 to isolate the at least a catalyst battery module as a function of the identification of the thermal event and the at least a catalyst battery module based on the thermal threshold.

Figure 2:
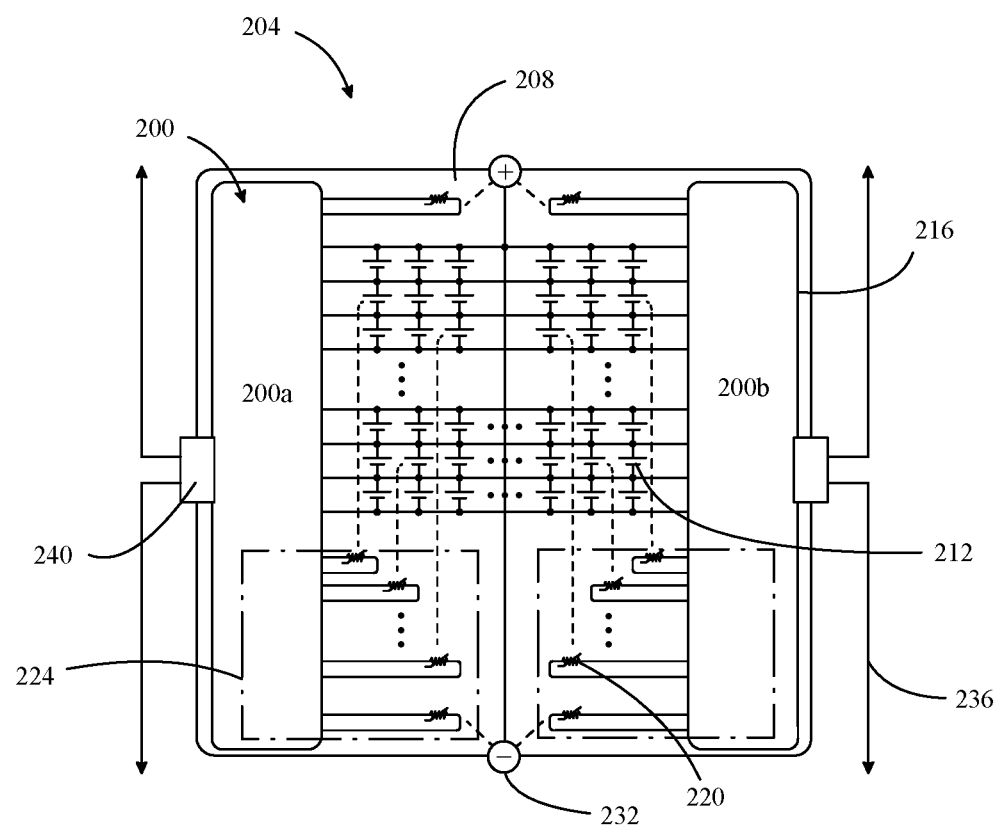
FIG. 2 is a block diagram of an exemplary embodiment of a module monitor unit in one or more aspect of the present disclosure.

Referring now to FIG. 2, an exemplary embodiment of a module monitor unit (MMU) 200 is presented in accordance with one or more embodiments of the present disclosure. MMU 200 may be consistent with any MMU as described in the entirety of this disclosure such as, but not limited to, MMU 108. In one or more embodiments, MMU 200 is configured to monitor an operating condition of a battery pack 204. For example, and without limitation, MMU 200 may monitor an operating condition of a battery module 208 and/or a battery cell 212 of battery pack 204. For instance and without limitation, battery module 208 may be consistent with any battery module as described herein such as, but not limited to, battery module 108. In one or more embodiments, MMU 200 may be attached to battery module 208, as shown in FIG. 2. For example, and without limitation, MMU 200 may include a housing 216 that is attached to battery module 208, where circuit of MMU 200 may be disposed at least partially therein, as discussed further in this disclosure. In one or more embodiments, a housing may include a polymer, stainless steel, carbon steel, fiberglass, and polycarbonate. In other embodiments, MMU 200 may be remote to battery module 208.

In one or more embodiments, a plurality of MMUs 200 may be configured to monitor battery module 208 and/or battery cell 212. For instance, and without limitation, a first MMU 200a may be positioned at one end of battery module 208, and a second MMU 200b may be positioned at an opposing end of battery module 208. This arrangement may allow for redundancy in monitoring of battery cell 212. For example, and without limitation, if first MMU 200a fails, then second MMU 200b may continue to work properly and monitor the operating condition of each battery cell 212 of battery module 208. In one or more embodiments, MMU 200 may monitor the operating condition of a plurality of battery cells, as shown in FIG. 2.

In one or more embodiments, MMU 200 is configured to detect a measurement parameter of battery module 208. For the purposes of this disclosure, a "measurement parameter" is a detected electrical or physical input, characteristic, and/or phenomenon related to a state of battery pack 204 and/or components thereof. For example, and without limitation, a measurement parameter may be a temperature, a voltage, a current, a moisture level/humidity, a gas level, or the like, as discussed further in this disclosure. In one or more embodiments, MMU 200 may be configured to perform cell balancing and/or load sharing during the charging of battery pack 204. Cell balancing may be used when a battery module includes a plurality of battery cells 212. Cell unbalance includes variances in charge and discharge of each battery cell depending on an operating condition of each battery cell 212. Cell unbalance may result in damage, such as degradation or premature charge termination, of a battery cell. For example, a battery cell with a higher SOC than other battery cells may be exposed to overvoltage during charging. Cell balancing may include compensating for a variance in SOC, internal impedance, total chemical capacity, or the like. For instance, MMU 200 may perform cell balancing for SOC and thus regulate voltage input of battery cells 212. For instance, and without limitation, charging of battery pack 204 may be shared throughout a plurality of battery cells 212 by directing electrical power through balance resistors and dissipating voltage through resistors as heat. For example, and without limitation, resistor may include a nonlinear resistor, such as a thermistor 220. Thermistor 220 may be configured to provide cell balancing by reducing a voltage supplied to a battery cell of the battery module. The reduction in the voltage supplied to the battery cell may be achieved via heat dissipation. In one or more non-limiting embodiments, MMU 200 may detect the charge of each battery and thermistors 220 of MMU 200 may be configured to reduce a current and/or voltage supplied to a battery cell 212 as a function of a temperature of the thermistor. For example, and without limitation, if a battery cell is being overcharged then the temperature of the connected circuit and thermistor may also experience and increase in temperature; as a result the thermistor may increase in resistance and a fraction of the supplied voltage across the thermistor will also change, which results in a decrease in voltage received by the battery cell. In this manner, battery cells 212 may be charged evenly during recharging and/or charging of battery pack 204 by, for example, a charging station or an electric grid. For example, and without limitation, battery cells with a lower SOC will charge more than battery cells with a greater SOC by thermistors 220 dissipating voltage to the battery cells with the greater SOC. In one or more embodiments, cell balancing may be equally distributed, where each battery cell receives an equal amount of electricity depending on how many amps are available from the charger and how many cells need to be charged. For example, and without limitation, a current may be equally distributed to each battery cell by MMU 200. In another embodiment, MMU 200 may detect an SOC of each battery cell and distribute current to each battery cell in various amounts as a function of the detected SOC of each battery cell. For example, and without limitation, MMU may detect that a first battery cell has an SOC of 20% and a second battery cell has as SOC of 80%. During recharging, the current and/or voltage to the first battery may be increased so that first battery cell is charged faster than the second battery cell. In one or more nonlimiting embodiments, once first battery cell is at the same SOC as the second battery cell during recharging, distribution of current and/or voltage to each battery cell may be adjusted again so that the first battery cell and the second battery cell receive an equal charge.

With continued reference to FIG. 2, in a non-limiting embodiment, MMU 200 is configured to monitor a temperature of battery module 208. For example, MMU 200 may include a sensor 224 configured to detect a temperature parameter of battery cell 212. Sensor 224 may be consistent with any sensor as described in the entirety of this disclosure. For example, and without limitation, sensor 224 may include thermistor 220, which may be used to measure a temperature parameter of battery cell 212. As used in this disclosure, a thermistor includes a resistor having a resistance dependent on temperature. In one or more embodiments, sensor 224 may include circuitry configured to generate an MMU datum correlated to the detected measurement parameter, such as a temperature of battery cell 212 detected by thermistor 220. An "MMU datum," as used in this disclosure, is a collection of information describing the measurement parameters of battery cell 212. The MMU datum may include any data describing the functionality, quality, and performance of MMU 200 and/or sensor 224. In a non-limiting embodiment, MMU 200a and MMU 200b may generate their respective MMU datums to compare the MMU datum measured by MMU 200a and the MMU datum measured by MMU 200b. In a non-limiting embodiment, the comparison may indicate one or more discrepancies related to the measurement parameters which may further indicate some thermal event. A thermistor may include metallic oxides, epoxy, glass, and the like. A thermistor may include a negative temperature coefficient (NTC) or a positive temperature coefficient (PTC). Thermistors may be beneficial due to being durable, compact, inexpensive, and relatively accurate. In one or more embodiments, a plurality of thermistors 220 may be used to provide redundant measuring of a state of battery cell 212, such as temperature. In other embodiments, MMU 200 may also include a resistance temperature detector (RTD), integrated circuit, thermocouple, thermometer, microbolometer, a thermopile infrared sensor, and/or other temperature and/or thermal sensors, as discussed further below in this disclosure. In one or more embodiments, thermistor 220 may detect a temperature of battery cell 212. Subsequently, MMU 200 may generate a sensor signal output containing information related to the detected temperature of battery cell 212. In one or more embodiments, sensor signal output may include the MMU datum containing information representing a detected measurement parameter.

Still referring to FIG. 2, sensor 224 may include a sensor suite or one or more individual sensors, which may include, but are not limited to, one or more temperature sensors, voltmeters, current sensors, hydrometers, infrared sensors, photoelectric sensors, ionization smoke sensors, motion sensors, pressure sensors, radiation sensors, level sensors, imaging devices, moisture sensors, gas and chemical sensors, flame sensors, electrical sensors, imaging sensors, force sensors, Hall sensors, airspeed sensors, throttle position sensors, and the like. Sensor 224 may be a contact or a non-contact sensor. For example, and without limitation, sensor 224 may be connected to battery module 208 and/or battery cell 212. In other embodiments, sensor 224 may be remote to battery module and/or battery cell 212. Sensor 224 may be communicatively connected to controller 320 of PMU 312 (shown in FIG. 3) so that sensor 224 may transmit/receive signals to/from controller 320, respectively, as discussed below in this disclosure. Signals, such as signals of sensor 224 and controller 320, may include electrical, electromagnetic, visual, audio, radio waves, or another undisclosed signal type alone or in combination. In one or more embodiments, communicatively connecting is a process whereby one device, component, or circuit is able to receive data from and/or transmit data to another device, component, or circuit. In an embodiment, communicative connecting includes electrically connecting at least an output of one device, component, or circuit to at least an input of another device, component, or circuit.

In one or more embodiments, WWII-J 200 may include a control circuit that processes the received Wv1U datum from sensor 224, Wv1U 200a, and/or Wv1U 200b. In one or more embodiments, the control circuit may be configured to perform and/or direct any actions performed by MMU 200 and/or any other component and/or element described in this disclosure. The control circuit may include any analog or digital control circuit, including without limitation a combinational and/or synchronous logic circuit, a processor, microprocessor, microcontroller, any combination thereof, or the like. In or more embodiments, the control circuit may be solely constructed from hardware; thus, the control circuit may perform without using software. Not relying on software may increase durability and speed of the control circuit while reducing costs. For example, and without limitations, the control circuit may include logic gates and/or thermistors, as discussed further in this disclosure. In some embodiments, the control circuit 228 may be integrated into MMU 200, as shown in FIG. 2. In other embodiments, the control circuit 228 may be remote to MMU 200. In one or more nonlimiting exemplary embodiments, if the MMU datum of a temperature of a battery module 208, such as at a terminal 232, is higher than a predetermined threshold, the control circuit 228 may determine that the temperature of battery cell 212 indicates a critical event and thus is malfunctioning. For example, a high voltage (HV) electrical connection of battery module terminal 232 may be short circuiting. If the control circuit 228 determines that a HV electrical connection is malfunctioning, the control circuit 228 may terminate a physical and/or electrical communication of the HV electrical connection to prevent a dangerous or detrimental reaction, such as a short, that may result in an electrical shock, damage to battery pack 204, or even a fire. Thus, the control circuit 228 may trip a circuit of battery pack 204 and terminate power flow through the faulty battery module 208 until the detected fault is corrected and/or the excessively high temperature is no longer detected. Temperature sensors, such as thermistor 220 may assist in the monitoring of a cell group's overall temperature, an individual battery cell's temperature, and/or battery module's temperature, as just described above.

In one or more embodiments, MMU 200 may not use software. For example, MMU 200 may not use software to improve reliability and durability of MMU 200. Rather, MMU 200 may be communicatively connected to a remote computing device, such as computing device 700 of FIG. 7. In one or more embodiments, MMU 200 may include one or more circuits and/or circuit elements, including without limitation a printed circuit board component, aligned with a first side of battery module 208 and the openings correlating to battery cells 212. In one or more embodiments, MMU 200 may be communicatively connected to a remote processing module, such as a controller. Controller may be configured to perform appropriate processing of detected temperature characteristics by sensor 224. In one or more embodiments, a controller may include an application-specific integrated circuit (ASIC), field-programmable gate array (FPGA), a central processing unit (CPU), readout integrated circuit (ROIC), or the like, and may be configured to perform characteristic processing to determine a temperature and/or critical event of battery module 208. In these and other embodiments, controller may operate in conjunction with other components, such as, a memory component, where a memory component includes a volatile memory and/or a non-volatile memory.

In one or more embodiments, each MMU 200 may communicate with another MMU 200 and/or a controller via a communicative connection 236. Each MMU may use a wireless and/or wired connection to communicate with each other. For example, and without limitation, MMU 200a may communicate with an adjacent MMU 200b using an isoSPI connection 304. As understood by one skilled in the art, an isoSPI connection may include a transformer to magnetically connect and electrically isolate a signal between communicating devices. Persons skilled in the art, upon reviewing the entirety of this disclosure, will be aware of the various embodiments of communication in the context of sensors.

Figure 3:
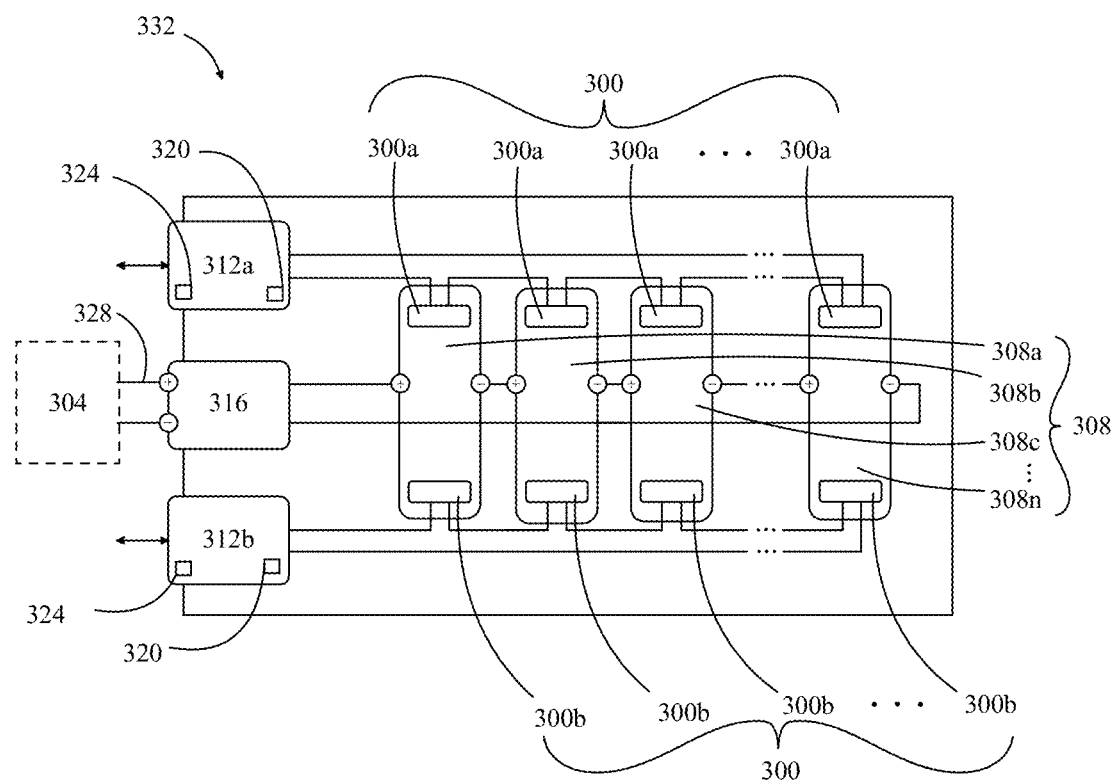
FIG. 3 is a block diagram of an exemplary embodiment of a battery pack in one or more aspects of the present disclosure.

Now referring to FIG. 3, a battery pack with a battery management component 300 that utilizes MMUs 300a-b for monitoring a status of battery pack 332 is shown in accordance with one or more embodiments of the present disclosure. MMUs 300a-b may include MMU 200 as described above. Battery pack 332 may be consistent with any battery pack as described in the entirety of this disclosure. For instance and without limitation, battery pack 332 may be consistent with the battery pack in U.S. patent application Ser. No. 17/529,447 and entitled, "MODULE MONITOR UNIT FOR AN ELECTRIC AIRCRAFT BATTERY PACK AND METHODS OF USE." In one or more embodiments, battery pack 332 may include battery module 308, which may be configured to provide energy to an electric aircraft 304 via a power supply connection 328. For the purposes of this disclosure, a "power supply connection" is an electrical and/or physical communication between a battery module 308 and electric aircraft 304 that powers electric aircraft 304 and/or electric aircraft subsystems for operation. In one or more embodiments, battery pack 332 may include a plurality of battery modules, such as modules 308a-n. For example, and without limitation, battery pack 332 may include fourteen battery modules. In one or more embodiments, each battery module 308a-n may include a battery cell, such as battery cell 212 (shown in FIG. 2).

Still referring to FIG. 3, battery pack 332 may include battery management component 300 (also referred to herein as a "management component"). In one or more embodiments, battery management component 300 may be integrated into battery pack 332 in a portion of battery pack 332 or a subassembly thereof. In an exemplary embodiment, and without limitation, management component 300 may be disposed on a first end of battery pack 332. One of ordinary skill in the art will appreciate that there are various areas in and on a battery pack and/or subassemblies thereof that may include battery management component 300. In one or more embodiments, battery management component 300 may be disposed directly over, adjacent to, facing, and/or near a battery module and specifically at least a portion of a battery cell of battery pack 332. In one or more embodiments, battery management component 300 includes module monitor units (MMU) 300a-b, a pack monitoring unit (PMU) 312, and high voltage disconnect 316. In one or more embodiments, battery management component 300 may also include a sensor 324. For example, and without limitation, battery management component 300 may include a sensor suite having a plurality of sensors, as discussed in this disclosure.

In one or more embodiments, MMUs 300a-b may be mechanically connected and communicatively connected to battery modules 308. As used herein, "communicatively connected" is a process whereby one device, component, or circuit is able to receive data from and/or transmit data to another device, component, or circuit. In an embodiment, communicative connecting includes electrically connecting at least an output of one device, component, or circuit to at least an input of another device, component, or circuit. In one or more embodiments, MMUs 300a-b may be configured to detect a measurement characteristic of battery modules 308 of battery pack 332. For the purposes of this disclosure, a "measurement characteristic" is detected electrical or physical input and/or phenomenon related to a condition state of battery pack 332. A condition state may include detectable information related to, for example, a temperature, a moisture level, a humidity, a voltage, a current, vent gas, vibrations, chemical content, or other measurable characteristics of battery pack 332, battery modules 308, and/or battery cells. For example, and without limitation, MMUs 300a-b may detect and/or measure a measurement characteristic, such as a temperature, of battery modules 308. In one or more embodiments, a condition state of battery pack 332 may include a condition state of a battery module of battery modules 308 and/or a battery cell. In one or more embodiments, MMUs 300a-b may include a sensor, such as sensor 324, which may be configured to detect and/or measure measurement characteristic. As used in this disclosure, a "sensor" is a device that is configured to detect an input and/or a phenomenon and transmit information and/or datum related to the detection, as discussed further below in this disclosure. Output signal may include a sensor signal, which transmits information and/or datum related to the sensor detection. A sensor signal may include any signal form described in this disclosure, for example digital, analog, optical, electrical, fluidic, and the like. In some cases, a sensor, a circuit, and/or a controller may perform one or more signal processing steps on a signal. For instance, sensor, circuit, and/or controller may analyze, modify, and/or synthesize a signal in order to improve the signal, for instance by improving transmission, storage efficiency, or signal to noise ratio.

In one or more embodiments, MMUs 300a-b may be configured to transmit a measurement datum of battery modules 308. MMUs 300a-b may generate an output signal such as measurement datum that includes information regarding detected measurement characteristic. For the purposes of this disclosure, "measurement datum" is an electronic signal representing an information and/or a parameter of a detected electrical and/or physical characteristic and/or phenomenon correlated with a condition state of battery pack 332. In one or more embodiments, measurement datum may include temperature value, current value, voltage value, humidity level, pressure level, chemical/byproduct level, vent gas detection, and other information regarding detected characteristics. For example, measurement datum may include data of a measurement characteristic regarding a detected temperature of a battery cell of battery modules 308. In one or more embodiments, measurement datum may be transmitted by MMUs 300a-b to PMU 312 so that PMU 312 may receive measurement datum, as discussed further in this disclosure. For example, MMUs 300a-b may transmit measurement data to a controller 320 of PMU 312.

In one or more embodiments, MMUs 300a-b may include a plurality of MMUs. For instance, and without limitation, each battery module 308a-n may include one or more MMUs of MMUs 300a-b. For example, and without limitation, each battery module 308a-n may include two MMUs 300a-b. MMUs 300a-b may be positioned on opposing sides of battery modules 308. Battery modules 308 may include a plurality of MMUs to create redundancy so that, if one MMU fails or malfunctions, another MMU may still operate properly. In one or more nonlimiting exemplary embodiments, MMUs 300a-b may include mature technology so that there is a low risk. Furthermore, MMUs 300a-b may not include software, for example, to avoid complications often associated with programming. MMUs 300a-b may be configured to monitor and balance all battery cell groups of battery pack 332 during charging of battery pack 332. For instance, and without limitation, MMUs 300a-b may monitor a temperature of battery modules 308 and/or a battery cell of battery modules 308. For example, and without limitation, MMUs 300a-b may monitor a battery cell group temperature. In another example, and without limitation, MMUs 300a-b may monitor a terminal temperature to, for example, detect a poor HV electrical connection. In one or more embodiments, an MMU of MMUs 300a-b may be indirectly connected to PMU 312. In other embodiments, MMUs 300a-b may be directly connected to PMU 312. In one or more embodiments, MMUs 300a-b may be communicatively connected to an adjacent MMU 200.

Still referring to FIG. 3, battery management component 300 includes pack monitoring unit (PMU) 312 which may be connected to an MMU of MMUs 300a-b. In one or more embodiments, PMU 312 includes a controller 320, which is configured to receive measurement datum from an MMU of MMUs 300a-b, as previously discussed in this disclosure. For example, PMU 312a may receive a plurality of measurement data from an MMU of MMUs 300a. Similarly, PMU 312b may receive a plurality of measurement data from an MMU of MMUs 300b. In one or more embodiments, PMU 312 may receive measurement datum from MMUs 3000a-b via communicative connections. For example, PMU 312 may receive measurement datum from MMUs 300a-b via an isoSPI communications interface. In one or more embodiments, controller 320 of PMU 312 is configured to identify an operating of battery module 308 as a function of measurement datum. For the purposes of this disclosure, an "operating condition" is a state and/or working order of battery pack 332 and/or any components thereof. For example, and without limitation, an operating condition may include a state of charge (SoC), a depth of discharge (DoD), a temperature reading, a moisture level or humidity, a gas level, a chemical level, or the like. In one or more embodiments, controller 320 of PMU 312 is configured to determine a critical event element if operating condition is outside of a predetermined threshold (also referred to herein as a "predetermined threshold"). For the purposes of this disclosure, a "critical event element" is a failure and/or critical operating condition of a battery pack, battery cell, and/or battery module that may be harmful to battery pack 332 and/or electric aircraft 304. For instance, and without limitation, if an identified operating condition, such as a temperature of a battery cell of a battery pack 332, does not fall within a predetermined threshold, such as a range of acceptable, operational temperatures of the battery cell, then a critical event element is determined by controller 320 of PMU 312. For example, and without limitation, PMU 312 may use measurement datum from an MMU of MMUs 300a-b to identify a temperature of 95 degrees Fahrenheit for a battery cell. If the predetermined threshold is, for example, 65 to 90 degrees Fahrenheit, then the determined operating condition is outside of the predetermined threshold, such as exceeding the upper temperature threshold of 90 degrees Fahrenheit, and a critical event element is determined by controller 320. As used in this disclosure, a "predetermined threshold" is a limit and/or range of an acceptable quantitative value and/or representation related to a normal operating condition of a battery pack and/or components thereof. In one or more embodiments, an operating condition outside of the threshold is a critical operating condition, which triggers a critical event element, and an operating condition within the threshold is a normal operating condition that indicates that battery pack 332 is working properly. For example, and without limitation, if an operating condition of temperature exceeds a predetermined threshold, then battery pack 332 is considered to be operating at a critical operating condition and may be at risk of overheating and experiencing a catastrophic failure.

In one or more embodiments, controller 320 of PMU 312 is configured to generate an action command if critical event element is determined by controller 320. For the purposes of this disclosure, a "action command" is a control signal, which is an electrical signal and/or transmission that represents a control command. Continuing the previously described example above, if an identified operating condition includes a temperature of 95 degrees Fahrenheit, which exceeds a predetermined threshold, controller 320 may determine a critical event element indicating that a battery pack 332 is working at a critical temperature level and at risk of catastrophic failure. In one or more embodiments, critical event elements may include high shock/drop, overtemperature, undervoltage, high moisture, contactor welding, and the like.

In one or more embodiments, controller 320 may include a computing device (as discussed in FIG. 7), a central processing unit (CPU), a microprocessor, a digital signal processor (DSP), an application specific integrated circuit (ASIC), a control circuit, a combination thereof, or the like. In one or more embodiments, output signals from various components of a battery pack 332 may be analog or digital. Controller 320 may convert output signals from an MMU of MMUs 300a-b and/or sensor 324 to a usable form by the destination of those signals. The usable form of output signals from MMUs 300a-b and/or sensors, through processor may be either digital, analog, a combination thereof, or an otherwise unstated form. Processing may be configured to trim, offset, or otherwise compensate the outputs of sensor. Based on MMU and/or sensor output, controller can determine the output to send to a downstream component. Processor can include signal amplification, operational amplifier (Op-Amp), filter, digital/analog conversion, linearization circuit, current-voltage change circuits, resistance change circuits such as Wheatstone Bridge, an error compensator circuit, a combination thereof or otherwise undisclosed components. In one or more embodiments, PMU 312 may run state estimation algorithms.

In one or more embodiments, MMUs 300a-b may be implemented in battery management system 300 of a battery pack 332. An MMU of MMUs 300a-b may include sensor 324, as previously mentioned above in this disclosure. For instance, and without limitation, MMUs 300a-b may include a plurality of sensors 324. For example, an MMU of MMUs 300a-b may include thermistors to detect a temperature of a corresponding battery module 308 and/or battery cell. An MMU of MMUs 300a-b may include sensor 324 or a sensor suite that is configured to measure physical and/or electrical parameters of a battery pack 332, such as without limitation temperature, voltage, current, orientation, or the like, of one or more battery modules of battery modules 308 and/or battery cells. An MMU of MMUs 300a-b may be configured to generate a measurement datum of each battery cell of a battery module of battery modules 308, which a control circuit may ultimately use to determine a failure within a battery module of battery modules 308 and/or a battery cell, such as a critical event element. Cell failure may be characterized by a spike in temperature and an MMU of MMUs 300a-b may be configured to detect that increase, which in turn, PMU 312 uses to determine a critical event element and generate signals, to disconnect a power supply connection between electric aircraft 304 and a battery cell and to notify users, support personnel, safety personnel, maintainers, operators, emergency personnel, aircraft computers, or a combination thereof. In one or more embodiments, measurement data of an MMU of MMUs 300a-b may be stored in a memory component of controller 320.

Still referring to FIG. 3, battery management component 300 may include high voltage disconnect 316, which may be communicatively connected to battery modules 308, wherein high voltage disconnect 316 is configured to terminate power supply connection 328 between battery modules 308 and electric aircraft 304 in response to receiving action command from PMU 312. PMU 312 may be configured to determine a critical event element, such as high shock/drop, overtemperature, undervoltage, contactor welding, and the like. High voltage disconnect 316 is configured to receive action command generated by PMU 312 and execute a control operation as a function of the action command. For the purposes of this disclosure, a "control operation" is a performance of an action related to an action command. For example, and without limitation, high voltage disconnect 316 may execute a control operation that includes a lock out of battery pack 332 for maintenance. In one or more embodiments, PMU 312 may create a lockout flag, which may be saved across reboots. A lockout flag may include an indicator alerting a user of termination of power supply connection 328 by high voltage disconnect 316. For instance, and without limitation, a lockout flag may be saved in a database of PMU 312 so that, despite rebooting a battery pack 332 or complete loss of power of battery pack 332, power supply connection 328 remains terminated and an alert regarding the termination remains. In one or more embodiments, lockout flag cannot be removed until a critical event element is no longer determined by controller 320. For, example, PMU 312 may be continuously updating an operating condition and determining if operating condition is outside of a predetermined threshold. In one or more embodiments, lockout flag may include an alert on a graphic user interface of, for example, a remote computing device, such as a mobile device, tablet, laptop, desktop and the like. In other embodiments, lockout flag may be indicated to a user via an illuminated LED that is remote or locally located on battery pack 332. In one or more embodiments, PMU 312 may include control of cell group balancing via MMUs, control of contactors (high voltage connections, etc.) control of welding detection, control of pyro fuses, and the like.

In one or more embodiments, battery management component 300 may include a plurality of PMUs 312. For instance, and without limitation, battery management component 300 may include a pair of PMUs. For example, and without limitation, battery management component 300 may include a first PMU 312a and a second PMU 312b, which are each disposed in or on battery pack 332 and may be physically isolated from each other. "Physical isolation", for the purposes of this disclosure, refers to a first system's components, communicative connection, and any other constituent parts, whether software or hardware, are separated from a second system's components, communicative coupling, and any other constituent parts, whether software or hardware, respectively. Continuing in reference to the non-limiting exemplary embodiment, first PMU 312a and second PMU 312b may perform the same or different functions. For example, and without limitation, the first and second PMUs 312a,b may perform the same, and therefore, redundant functions. Thus, if one PMU 312a/b fails or malfunctions, in whole or in part, the other PMU 312b/a may still be operating properly and therefore battery management component 300 may still operate and function properly for battery pack 332. One of ordinary skill in the art would understand that the terms "first" and "second" do not refer to either PMU as primary or secondary. In non-limiting embodiments, the first and second PMUs 312a,b, due to their physical isolation, may be configured to withstand malfunctions or failures in the other system and survive and operate. Provisions may be made to shield first PMU 312a from PMU 312b other than physical location, such as structures and circuit fuses. In non-limiting embodiments, first PMU 312a, second PMU 312b, or subcomponents thereof may be disposed on an internal component or set of components within battery pack 332, such as on battery module sense board, as discussed further below in this disclosure.

Still referring to FIG. 3, first PMU 312a may be electrically isolated from second PMU 312b. "Electrical isolation", for the purposes of this disclosure, refers to a first system's separation of components carrying electrical signals or electrical energy from a second system's components. First PMU 312a may suffer an electrical catastrophe, rendering it inoperable, and due to electrical isolation, second PMU 312b may still continue to operate and function normally, allowing for continued management of battery pack 332 of electric aircraft 304. Shielding such as structural components, material selection, a combination thereof, or another undisclosed method of electrical isolation and insulation may be used, in nonlimiting embodiments. For example, and without limitation, a rubber or other electrically insulating material component may be disposed between electrical components of first and second PMUs 312a,b, preventing electrical energy to be conducted through it, isolating the first and second PMUs 312a,b from each other.

With continued reference to FIG. 3, battery management component 300 may include a memory component, as previously mentioned above in this disclosure. In one or more embodiments, a memory component may be configured to store datum related to battery pack 332, such as data related to battery modules 308a-n and/or battery cells of battery pack 332. For example, and without limitation, a memory component may store sensor datum, measurement datum, operation condition, critical event element, lockout flag, and the like. A memory component may include a database. A memory component may include a solid-state memory or tape hard drive. A memory component may be communicatively connected to PMU 312 and may be configured to receive electrical signals related to physical or electrical phenomenon measured and store those electrical signals as battery module data. Alternatively, a memory component may be a plurality of discrete memory components that are physically and electrically isolated from each other. One of ordinary skill in the art would understand the virtually limitless arrangements of data stores with which battery pack 332 could employ to store battery pack data.

Figure 4:
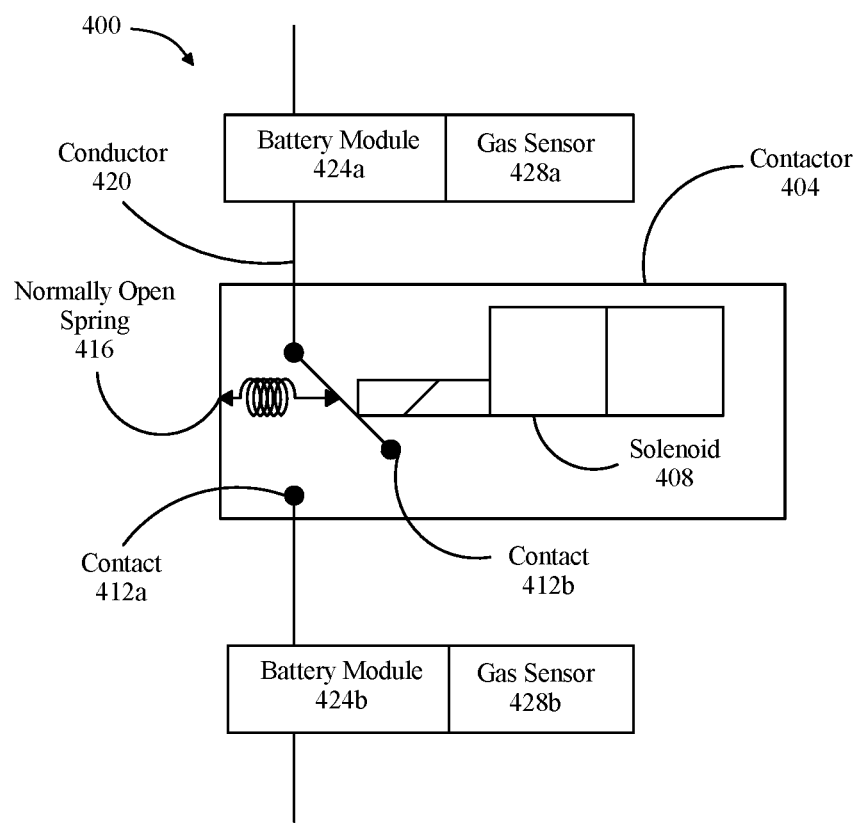
FIG. 4 is a block diagram of an exemplary embodiment of a system for a contactor in a battery management in an electric aircraft.

Referring now to FIG. 4, a block diagram of an exemplary embodiment of a system 400 for a contactor in a battery management in an electric aircraft is illustrated. Contactor 404 may be consistent with any contactor as described in the entirety of this disclosure. In some embodiments, a contactor 404 may be located within a battery pack. The battery pack may be consistent with any battery pack as described in the entirety of this disclosure. An exemplary solenoid-type contactor 404 is illustrated in FIG. 4, although contactor 404 may be of any type. Contactor 404 may include a solenoid 408. As used in this disclosure, a "solenoid" is an electromechanical system that uses an electromagnetic force to introduce an electrically controllable movement, for example without limitation a translational movement. In some cases, a solenoid may be normally open or normally closed. Solenoid may be spring loaded, such that when in a state of substantially no electromagnetic force the solenoid is a predetermined position. Solenoid 408 may be configured to switch at least a contact 412a-b. Contacts 412a-b may include any conductive material including without limitation metals. In some cases, contacts 412a-b may be coated, for instance with a coating that is resistant to damage for example, from a resulting arc. For instance coating may have a high thermal resistance, high hardness, or the like. In some cases, contactor 404 may be normally open or normally closed. In some cases, a normal position of contactor 404 may be determined according to a pre-loading force. Pre-loading force may be applied by a compliant element 416, such as without limitation a spring 416 or an elastic device 416. Exemplary non-limiting springs 416 include torsion springs, compression springs, coil springs, wave springs, Belleville washers, gas springs, and the like. Spring 416 may be configured to position contacts 412a-b when little or substantially no electromotive force is applied from solenoid 408. Contactor 404 may be configured to provide electrical communication when contacts 412a-b are in physical contact with one another and provide substantially no electrical communication when contacts 412a-b are not in physical contact.

Still referring to FIG. 4, in some embodiments, contactor 404 may be located substantially within the battery pack. For example, contactor 404 may be located in series with a conductor 420 disposed between two or more battery modules 424a-b. In some cases, system 400 may be configured such that when contactor 404 is permitting electrical communication via conductor 420, a first battery module 424a is in electrical communication with a second battery module 424b. First battery module 424a may be in electrical communication with second battery module 424b in series or parallel. In some embodiments, at least a gas sensor 428a-b may be configured to detect a gas parameter associated with a gas associated with an individual battery module 424a-b. For example, in some cases, a first gas sensor 428a may be disposed in sensed communication with gas proximal to or discharged from first battery module 424a and a second gas sensor 428b may be disposed in sensed communication with gas proximal to or discharged from second battery module 424b. In some cases, computing device may control at least a contactor 404 in order to electrically isolate battery modules 424a-b from a battery pack. In an exemplary embodiment, a first gas sensor 428a may detect a gas parameter from gas associated with first battery module 424a, which computing device determines is indicative of a battery condition predisposed to thermal runaway. In this exemplary embodiment, computing device may control at least a contactor 404 to disengage electrical communication and thereby isolate first battery module 424a, for example from second battery module 424b and/or battery pack as a whole.

Figure 5:
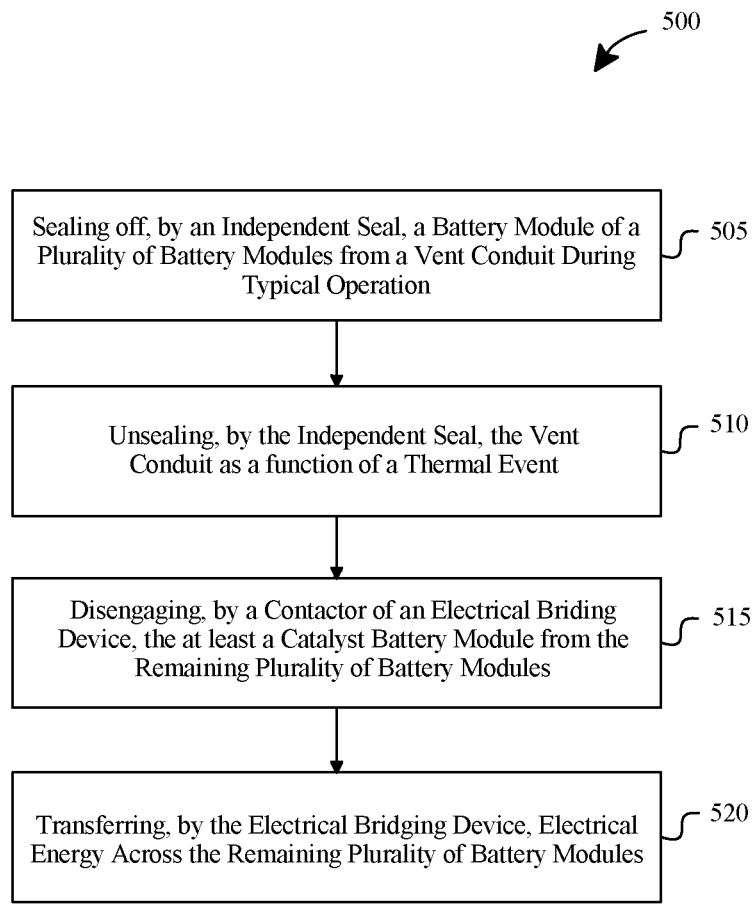
FIG. 5 is a flow diagram of an exemplary embodiment of a method for a venting seal for battery modules in an electric aircraft.

Referring now to FIG. 5, a flow diagram of an exemplary embodiment of a method 500 for a venting seal for battery modules in an electric aircraft is provided. Method 500, at step 505, may include sealing off, by an independent seal, a battery module of a plurality of battery modules from a vent conduit during typical operation. Independent seal may include any independent seal as described herein. In a non-limiting embodiment, the independent seal may include mica materials. For example and without limitation, the mica materials may be in any configurations such as, but not limited to, sheets, layers, blocks, etc. The battery module may include any battery module as described herein. In a non-limiting embodiment, each battery module may include a model monitor unit (MMU). The MMU may include any MMU as described herein. In a non-limiting embodiment, method 500 may include detecting, by a module monitor unit, a measured battery data and generating a thermal datum as a function of the measured battery data. The measured battery data may include any measured battery data as described herein. The thermal datum may include any thermal datum as described herein. The vent conduit may include any vent conduit as described herein. Typical operation may include any typical operation as described herein. In a non-limiting embodiment, sealing off by the independent seal may use any sealing mechanism as consistent with the entirety of this disclosure. Persons skilled in the art, upon reviewing the entirety of this disclosure, will be aware of the various methods and purposes of sealing off battery modules in the context of ventilation and containment.

Still referring to FIG. 5, method 500, at step 510, may include unsealing, by the independent seal, the vent conduit as a function of a thermal event. The thermal event may include any thermal event as described herein. In a non-limiting embodiment, the independent seal may unseal as a function of a thermal threshold. The thermal threshold may be consistent with any thermal threshold as described herein. In another non-limiting embodiment, method 500, at step 510, may include unsealing as a function of any unsealing mechanism as consistent with the entirety of this disclosure. For example and without limitation, method 500 may include the independent seal melting, deteriorating, and/or weakening as a function of extreme high heat and temperature from the battery module. In another non-limiting example, method 500 may include the independent seal fracturing and/or breaking apart as a function of high pressure and/or impact from the battery ejecta, chemicals, gases, heat, or combination thereof exiting from the battery module. Persons skilled in the art, upon reviewing the entirety of this disclosure, will be aware of the various embodiments and instances of unsealing a vent opening in the context of ventilation and cooling of a high temperature battery module.

Still referring to FIG. 5, method 500, at step 515, may include disengaging, by a contactor of an electrical bridging device, the at least a catalyst battery module from the remaining plurality of battery modules. The electrical bridging device may include any electrical bridging device as described herein. The at least a catalyst battery module may be consistent with any catalyst battery module as described herein. For example and without limitation, the at least a catalyst battery module may include any battery module experiencing and/or causing a thermal event. The contactor may be consistent with any contactor as described herein. The at least a catalyst battery module may be consistent with any catalyst battery module as described herein. In a nonlimiting embodiment, one or more battery modules may be the at least a catalyst battery modules. In another non-limiting embodiment, method 500 may include disengaging the at least a catalyst battery as a function of a thermal threshold. The thermal threshold may include any thermal threshold as described herein. Persons skilled in the art, upon reviewing the entirety of this disclosure, will be aware of the various methods in disengaging one or more battery modules in the context of isolation based on some threshold.

Still referring to FIG. 5, method 500 may include disengaging, by the contactor, the at least a catalyst battery module as a function of a disconnect assembly. The disconnect assembly may include any disconnect assembly as described herein. In a non-limiting embodiment, the disconnect assembly may be communicatively connected to a vent conduit and/or terminal post. The vent conduit may include any vent conduit as described herein. The terminal post may include any terminal post as described herein. In a non-limiting embodiment, each battery module may include a terminal post and/or a vent conduit. In a non-limiting embodiment, method 500 may include cooling the at least a catalyst battery module as a function of a cooling device. The cooling device may include any cooling device as described herein. In a non-limiting embodiment, the cooling device may include cooling fins.

Still referring to FIG. 5, method 500, at step 520, may include transferring, by the electrical bridging device electrical energy across the remaining plurality of battery modules. In a non-limiting embodiment, method 500 may include reestablishing a connection between the remaining plurality of battery modules in the event the at least a catalyst battery module is disengaged. Persons skilled in the art, upon reviewing the entirety of this disclosure, will be aware of the various embodiments of maintaining constant connection for transfer of electrical energy in the context of isolating at least a catalyst battery module.

Figure 6:
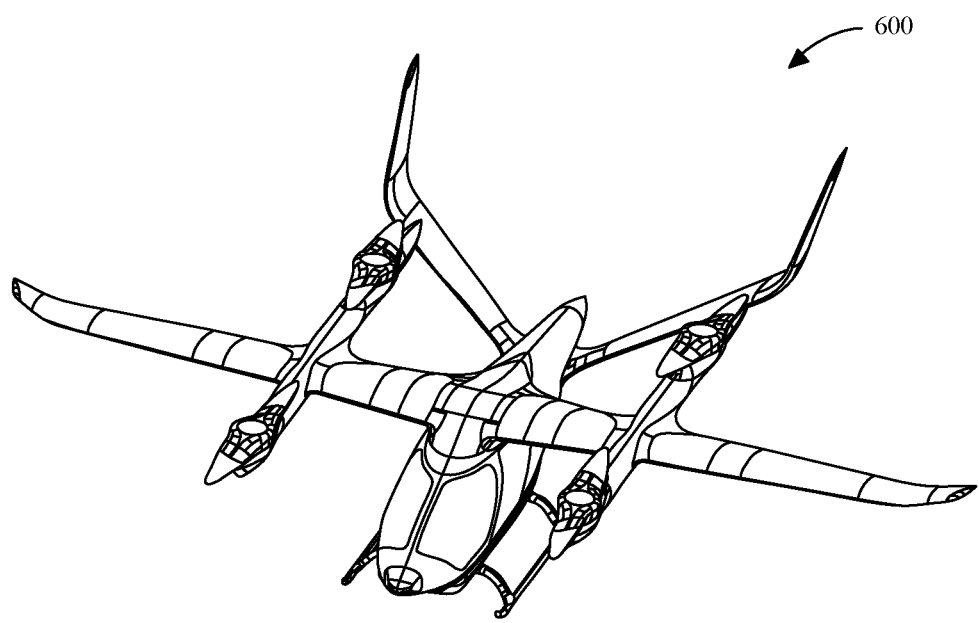
FIG. 6 is a schematic representation of an exemplary electric aircraft.

Now referring to FIG. 6, an exemplary embodiment of an electric aircraft 600 is illustrated in accordance with one or more embodiments of the present disclosure. An "aircraft", as described herein, is a vehicle that travels through the air. As a non-limiting example, aircraft may include airplanes, helicopters, airships, blimps, gliders, paramotors, drones, and the like. Additionally or alternatively, an aircraft may include one or more electric aircrafts and/or hybrid electric aircrafts. For example, and without limitation, electric aircraft 600 may include an electric vertical takeoff and landing (eVTOL) aircraft, as shown in FIG. 6. As used herein, a vertical takeoff and landing (eVTOL) aircraft is an electrically powered aircraft that can take off and land vertically. An eVTOL aircraft may be capable of hovering. In order, without limitation, to optimize power and energy necessary to propel an eVTOL or to increase maneuverability, the eVTOL may be capable of rotor-based cruising flight, rotor-based takeoff, rotor-based landing, fixed-wing cruising flight, airplane-style takeoff, airplane-style landing, and/or any combination thereof. Rotor-based flight is where the aircraft generates lift and propulsion by way of one or more powered rotors coupled with an engine, such as a "quad copter," helicopter, or other vehicle that maintains its lift primarily using downward thrusting propulsors. Fixed-wing flight, as described herein, flight using wings and/or foils that generate life caused by an aircraft's forward airspeed and the shape of the wings and/or foils, such as in airplane-style flight.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
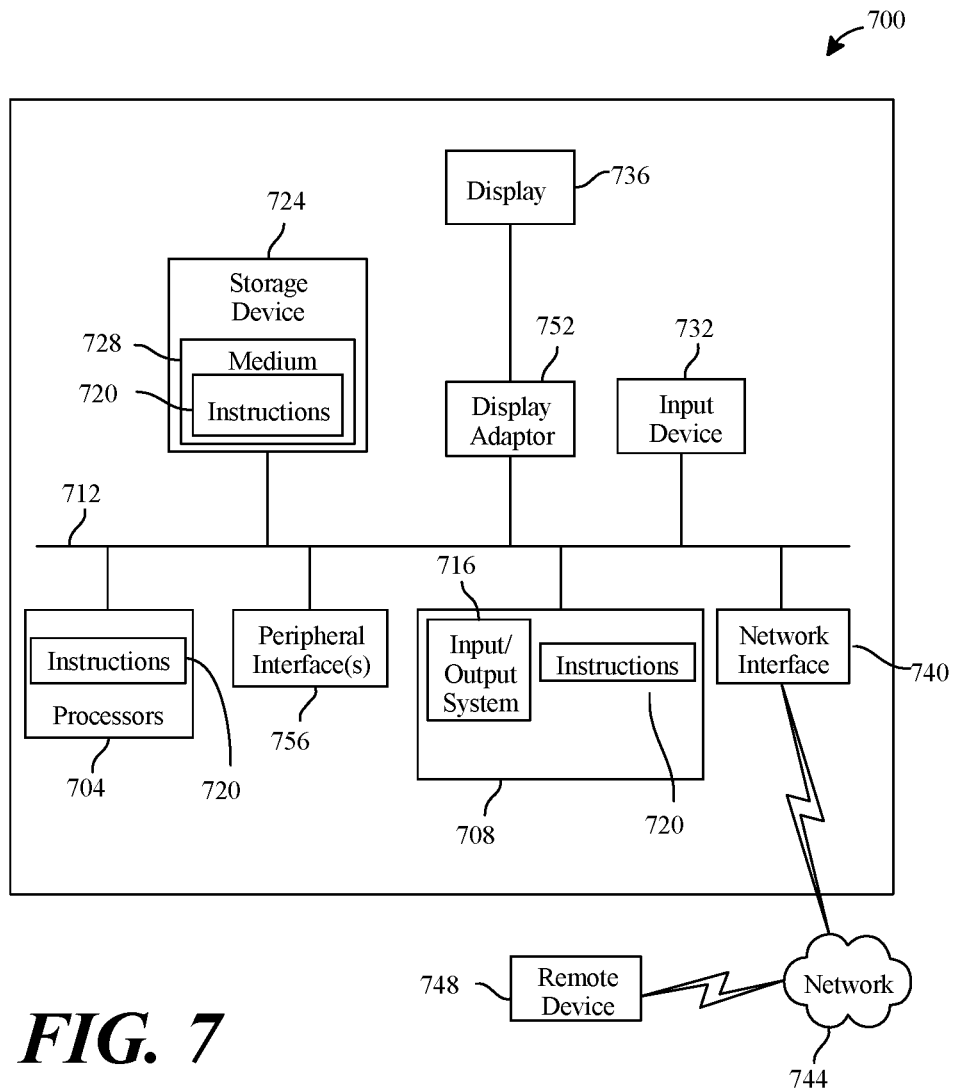
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An electric aircraft, comprising:
a system for venting battery modules in the electric aircraft, the system comprising:
a plurality of battery modules, wherein each battery module comprises:
a module monitor unit (MMU) configured to detect at least one measured battery data and generate a thermal datum as a function of the measured battery data for each battery module; an independent seal comprising a plurality of mica layers; and a vent conduit, wherein the independent seal is positioned between the battery module and the vent conduit; and
wherein the independent seal is configured to: seal off the battery module from the vent conduit during a typical operation of the electric aircraft; and unseal the battery module from the vent conduit as a function of a thermal event, wherein the plurality of mica layers of the independent seal breaks apart during the thermal event;
a computing device communicatively connected to each MMU of the plurality of battery modules, wherein the computing device is configured to determine the thermal event as a function of the thermal datum from the plurality of MMUs;
an electrical bridging device in electric communication with each battery module of the plurality of battery modules, wherein the electrical bridging device is configured to:
disengage at least a catalyst battery module associated with the thermal event from a remaining plurality of battery modules of the plurality of battery modules through a switch of a contactor, wherein the contactor is in contact with the electrical bridging device; and
transfer electrical energy across the remaining plurality of battery modules through the electrical bridging device.

2. The electric aircraft of claim 1, wherein the vent conduit is configured to provide a passage to allow ejecta to move to a vent outlet.

3. The electric aircraft of claim 1, wherein the contactor is further configured to disengage the at least a catalyst battery module as a function of determining the thermal event based on a thermal threshold.

4. The electric aircraft of claim 1, further comprising:
a plurality of disconnect assemblies,
wherein each battery module is connected to a disconnect assembly of the plurality of disconnect assemblies, and
wherein the plurality of disconnect assemblies are configured to disengage a respective battery module to which it is connected from the electrical bridging device.

5. The electric aircraft of claim 1, wherein the computing device is further configured to: isolate the at least a catalyst battery module as a function of the contactor.

6. The electric aircraft of claim 1, wherein the contactor is further configured to reestablish an electrical connection between the remaining plurality of battery modules as a function of disengaging the at least a catalyst battery module.

7. The electric aircraft of claim 1, wherein the vent conduit is configured to allow cooling of the at least a catalyst battery module as a function of a cooling device.

8. The electric aircraft of claim 7, wherein the cooling device further comprises a cooling fin configured to dissipate heat from the at least a catalyst battery module within the vent conduit.

* * * * *

UNITED STATES PATENT AND TRADEMARK OFFICE
CERTIFICATE OF CORRECTION

PATENT NO. : 11,949,121 B2
APPLICATION NO. : 17/564391
DATED : April 2, 2024
INVENTOR(S) : Tyler John Skroski et al.

It is certified that error appears in the above-identified patent and that said Letters Patent is hereby corrected as shown below:

In the Specification

In Column 18, Lines 12-14 read "In one or more embodiments, WWII-J 200 may include a control circuit that processes the received Wv1U datum from sensor 224, Wv1U 200a and/or Wv1U 200b." It should read "In one or more embodiments, MMU 200 may include a control circuit that processes the received MMU datum from sensor 224, MMU 200a and/or MMU 200b."

Signed and Sealed this
Fourteenth Day of May, 2024

Katherine Kelly Vidal
*Director of the United States Patent and Trademark Office*